Sept. 8, 1959
H. W. AVERY
2,903,281
METALLIC FLUID SEAL
Filed Aug. 28, 1956
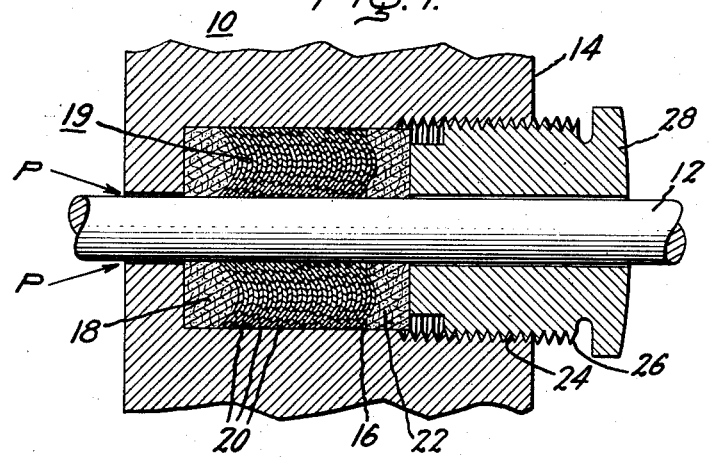
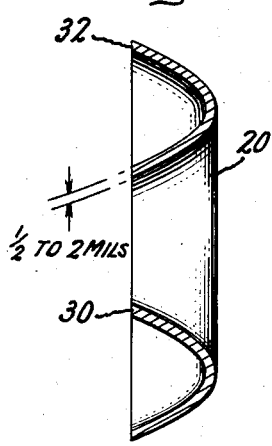
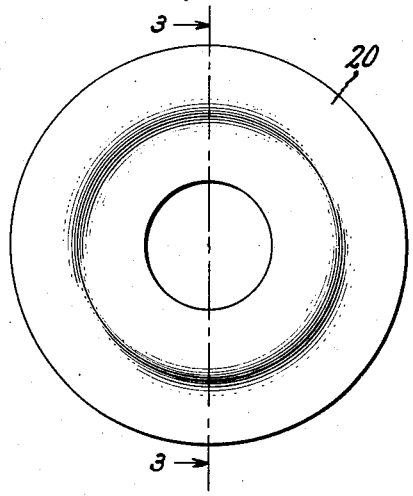
Inventor:
Howard W. Avery,
by Roe D McBurnett
His Attorney.

United States Patent Office 2,903,281
Patented Sept. 8, 1959

2,903,281

METALLIC FLUID SEAL

Howard W. Avery, Schenectady, N.Y., assignor to General Electric Company, a corporation of New York Application August 28, 1956, Serial No. 606,628

3 Claims. (Cl. 286—35)

The present invention relates to a metallic fluid seal and more particularly to a metallic fluid seal for utilization in high temperature service and which is insensitive to radioactive ambients.

In the general field of hydraulic packing, for example in linear hydraulic actuator piston rods and the like, presently available packings or rod seals of the O-ring, Chevron or U-cup types are usually composed of plastics, rubbers or leathers that are sensitive to fluid and temperature ambients and in many cases are unsatisfactory for use in radioactive areas. At present, advanced requirements for packings currently exist in the high temperature field, such as in the 500° to 1,000° Fahrenheit temperature spectrum, and in particular in the static or dynamic fluid sealing field.

Although thermoplastics and some other synthetic materials may be adequately used as packings up to 450° Fahrenheit, these materials cannot be used in radioactive areas since they are sensitive thereto. Therefore, the utilization of synthetic and organic materials, now in use, to solve high temperature sealing for use in radioactive areas, will be inadequate and quite inefficient.

The present invention is specifically concerned with a high temperature fluid seal for such mechanisms as linear hydraulic piston rods or the like, although not limited to this particular area of static or dynamic fluid sealing, wherein a metallic foil, such as aluminum or the like, is utilized as a material for the construction of wafer type seals wherein a plurality of such wafers are utilized as a hydraulic packing. The metallic foil seals retain the flexibility of conventional non-metallic packings due to the ductility of the foil elements and accordingly, the plurality of coacting elements, biased to react as a single unit in response to fluid pressure, are capable of continuously sealing at both their internal and external diameters.

An important advantage of the invention is that the foil seal elements, being metallic, are capable of withstanding temperature ambients consistent with the type of metal chosen for the foil. For instance, commercially available aluminum foil will be suitable as a sealing material for construction of sealing wafers to substantially 600° Fahrenheit, while other metallic foils are available for use at 1,000° Fahrenheit or higher. Also, the foil seal elements are manufactured in one piece to eliminate any leakage of fluid therethrough, such as experienced with a split ring type of metallic seal, and therefore, no fluid flow will be experienced through the main body of the foil seal elements in their mutually coacting operational position.

Additional advantages and features of the metallic foil seal of this invention include economical production costs, simplicity of assembly and dismantling facilitating replacement, high resistance to tension and compression forces tending to deform the seal, and simplicity of storage and handling as will be more fully explained herein.

A metallic wafer high temperature seal will be in-
expensive to produce, since, for example, aluminum sheeting of .005" and less in thickness, commercially termed "foil," is readily obtainable on the market and is adaptable for use in the usual die techniques, which can mass produce these metallic wafers in great quantity, especially from foil ranging in thickness from .005" to .002". Manufacturing tolerances may be very generous insofar as the geometric pattern and the inside and outside diameters of the wafers are concerned, for example, the usually held ten-thousandths tolerances in metallic split seal construction is herein reduced to a mere thousandths. Accordingly, the geometric configuration of the metallic wafers has no critical dimensions and, of course, the number of wafers that are utilized together can be of any suitable quantity dependent on the viscosity of the particular fluid used.

Therefore, it can be readily seen that the production of wafers from commercially available metallic foil, such as aluminum, is a simple and inexpensive process devoid of the usual complexities associated with presently utilized synthetic and organic material seals, or with the large thickness split ring type of metallic seals found in the prior art.

The metallic wafers of the present invention may be assembled in great numbers without any complexity because of the inherent ductility and malleability of the foil thin wafers to adjust themselves to any desirable configuration called for by the particular installation at hand.

Also, the excellent sealing characteristics of the metallic foil wafers, at their inner and outer diameters, are a direct function of the ability of the wafers to undergo large permanent deformations in tension and large permanent deformations in compression in their operational coaction with their environmental structure. It can also be seen that such desirable stress characteristics will also prolong the operational longevity of the metallic wafer elements over what would ordinarily be expected from metallic foil in such use as disclosed by the present invention.

Further, the seals may be dismantled and reassembled quite easily, and if necessary, various wafers may be replaced without any problem of adjusting the tolerances of the new seals to the previously used seals due to the ability of the ductile seals to assume the desired configuration. The fact that the assembly techniques are not critical increases the safety factor of the installation due to the reduction in possible error in the assembling thereof.

Also, since the wafer seals can easily accommodate themselves to use in a plurality of juxtaposed members, the assembly may also be amendable to a cartridge configuration, whereby a plurality of metallic foil wafers may be stored in suitable stacked numbers as called for in various installations. In this manner, the shipping and storage problem for these metallic wafer seals can be standardized at the manufacturer's plant to eliminate consecutive handling by maintenance personnel. This can be of importance whenever rigid control of maintenance procedure is desired for stabilizing operating conditions in precision mechanisms.

The desired configuration of the plurality of juxtaposed seals is maintained by the coaction of all the seals together and with a pair of biasing back-up rings. For example, different structural configurations peculiarly designed for each expected installation are not required; such as is usually the case with the installation of such sealing devices as conventional split metallic ring packings which are normally set obliquely against the slideable piston or rod and, of course, will vary with each slightly different installation configuration. Further, the metallic foil wafers of the present invention are maintained in operating position by their mutual coaction with each other so as to uniformly distribute the pressure thereon over all of the sealing wafers. Therefore, the pressure of the fluid medium does not substantially effect the position of the sealing wafers relative to each other, nor to the configuration assumed in static or dynamic sealing.

A permanent and tight joint is maintained between the relative moving elements in the assembly by the ductility of the metallic foil wafer seals which enables them to accommodate themselves to the necessary configuration needed to maintain a suitable sealing joint. Since the metallic wafer seals are quite adaptable for operation in large coacting numbers, they may be used for most types of sealing problems, such as in rotary actuator vane seals, pistons, regulator rods, and the like. Accordingly, a metallic foil wafer seal is herein disclosed for high temperature service which is insensitive to radioactive ambients.

An object of the present invention is the provision of metallic fluid seals adapted to high temperature service and which are insensitive to radioactive ambients.

Another object is to provide metallic seals wherein a permanent and tight joint is maintained in an assembly by the inherent ductility of the metallic foil wafer seals.

A further object of the invention is the provision of metallic seals wherein the configuration of a plurality of metallic foil wafer seals is maintained by the mutual coaction of the end biased wafer seals.

Another object is to provide metallic foil wafer seals maintained in operating position by the mutual coaction of the various seal members with each other so as to uniformly distribute the fluid pressure therebetween.

A still further object of the present invention is the provision of metallic foil seals having ductile and non-porous bodies with inherent flexibility for maintaining sealing at both the inner and outer edges.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

Figure 1 is a section view of a preferred embodiment of the invention illustrating the application of the metallic foil wafer seals in a linear hydraulic actuator piston rod;

Figure 2 is a plan view of one of the metallic foil wafer seals utilized in Figure 1; and Figure 3 is a sectional view of the seal taken on the line 3—3 of Figure 2 looking in the direction of the arrows.

Referring now to the drawings, there is illustrated a preferred embodiment 10 comprising a longitudinally slideable piston rod 12 operatively coacting with a linear hydraulic actuator 14, partly shown, which contains fluid under pressure as indicated by the arrows "P." The linear hydraulic actuator 14 is formed with a stuffing-box cavity 16 through which the piston rod 12 extends.

A back-up ring 18, made of suitable temperature resistive materials, such as asbestos or the like, is provided at one end of the cavity 16. A plurality of juxtaposed metallic foil wafer seals 20 are provided in coacting relationship with the ring 18. The ring 18 may be of any desired configuration which is a function of the desired configuration for the seals 20. A second back-up ring 22, of similar material as the back-up ring 18, is provided with a suitable configuration to bias the assembly 19 of metallic foil wafer seals 20. The interior wall of the stuffing-box cavity 16 is provided with internal threads 24 for operative engagement with external threads 26 formed on the peripheral surface of a gland nut 28, as shown in Figure 1. In this manner, the plurality of metallic foil wafer seals 20 may be suitably biased by adjusting the pressure exerted thereon by the back-up rings 18 and 22 through the adjustment of the gland nut 28.

Each metallic foil wafer seal, as shown in Figure 2, is formed in the shape of a substantially circular disc with an inner circumferential edge 30 and an outer circumferential edge 32, as shown in Figure 3. It should be understood, of course, that the metallic foil wafer seals may be of any suitable size and shape corresponding to the particular installation at hand. The seals are formed so that their inner edge 30 and their outer edge 32 will always be in contact with the peripheral surface of the coacting piston rod 12 and with the interior wall of the stuffing-box cavity 16, respectively. Consequently, each seal 20 will be continuously sealing at both its inner and outer edges due to the ductility of the seal and the mutual coaction of the plurality of seals in the assembly 19 when in their operative position, as shown in Figure 1.

The seal assembly 19, in the preferred embodiment 10, is usually formed by removing the slideable piston rod 12 from the linear hydraulic actuator 14, so that the back-up ring 18 may be properly placed within the stuffing-box cavity 16 and the metallic foil wafer seals 20, in a predetermined number, are thereafter positioned therein. The back-up ring 22 is placed within the cavity 16 so as to bias the seal assembly 19 through the engaging threads 24 and 26 and the gland nut 28, which is adjusted to obtain an initial positioning of the assembly 19. The piston rod 12 is thereafter inserted through the center aperture of the gland nut 28, the back-up ring 22, the seal assembly 19 and the back-up ring 18. Thereafter, the gland nut 28 may be further adjusted so that the friction between the piston rod 12 and the assembly 19 will be suitably adjusted to maintain proper sliding action therebetween.

The metallic foil wafer seals 20, exaggerated in curvature and thickness in Figures 1 and 3, respectively, for purposes of illustration, may be of any desired configuration, as previously stated, which will facilitate the proper placement of a plurality of seals for mutual sealing coaction against the fluid pressure exerted thereon. In the preferred embodiment 10, the configuration of the seals 20 is such that the inner circumferential edge 30 and the outer circumferential edge 32 are co-planar, as shown in Figure 3. In this manner, a plurality of seals may be placed in juxtaposed position so that the approximate concave configuration will eliminate any relative radial displacement of adjacent seals relative to each other. In this manner, the plurality of metallic foil wafer seals 20 will coact as a single assembly 19.

Since the metallic foil wafer seals 20 retain the flexibility of conventional non-metallic packings, they are capable of sealing at both their inner and outer edges. Insofar as the coaction of the inner circumferential edges of the metallic foil wafer seal assembly 19 and the slideable rod 12 is concerned, the inner edges will be exposed to both tension and compression. The ductility and malleability of the metallic foil, such as aluminum or the like, will permit large permanent deformations in the direction of these stresses.

Accordingly, continuous coaction will exist between the inner circumferential edges 30 of the metallic foil wafer seal assembly 19 and the peripheral surface of the rod 12, so that the adherence of the wafer seals to the peripheral surface of the piston rod 12 will eliminate any fluid flow therebetween. The reaction of the outer circumferential edges 32 of the seals 20 with the interior wall of the stuffing-box cavity 16, in this area of static fluid sealing, will prevent any leakage therethrough. Further, since the metallic foil wafer seals are of foil thickness and inherently ductile, it will be inherently impossible to transfer any deflection or movement from the inner circumferential edges 30 to the outer circumferential edges 32. As shown in Figure 3, the metallic foil wafers having a thickness between one half (½) and two (2) mils, will not have sufficient rigidity to transmit any deflection therethrough. Thus, any displacement of the inner circumferential edges 30 will be restricted to that immediate vicinity and would not affect the juxtaposed relationship of the individual seals in the assembly 19.

Briefly, a high temperature seal for use in radioactive areas is disclosed wherein the seals are manufactured from commercially available metallic foil, such as aluminum or the like, which is susceptible to simple and economical manufacturing techniques. Also, the present invention presents a metallic foil wafer seal which does not necessitate a complex maintenance procedure. The simplicity of the metallic foil wafer seals 20 can be easily seen when consideration is given to the fact that plain commercial metallic foil is utilized instead of the conventional synthetic and organic materials which require the observance of extreme tolerances in manufacturing and maintenance thereof, along with the usual complexity in manufacturing.

The metallic foil wafer seals 20 are capable of sealing at both their inner and outer circumferential edges because of the inherent ductility and malleability of the metallic foil utilized. Further, the specific configuration of the metallic foil wafer seals may be of any desired shape, depending on the particular installation while the particular metal chosen for the foil would be dependent on the temperature to be encountered.

It should be understood, of course, that the foregoing disclosure relates to only a preferred embodiment of the invention and that it is intended to cover all changes and modifications of the example of the invention herein chosen for the purposes of the disclosure, which do not constitute the departures from the spirit and scope of the invention as set forth in the appended claims.

What is claimed is:

1. A metallic fluid seal adapted for use in high temperature applications comprising a plurality of annular non-planar ductile, metallic foil wafers stacked in a juxtaposed assembly, each of said wafers having a thickness of 5 mils or less to thereby prevent the transfer of deflections from one edge to another edge.

2. A metallic fluid seal adapted for use in high temperature applications comprising a plurality of annular ductile metallic foil wafers stacked in a juxtaposed assembly and adapted to be fitted within a stuffing box, each of said wafers being provided with an opening at the center thereof and adapted to receive a piston rod therethrough, each of said wafers being of concave radial configuration with the inner and outer circumferential edges being substantially co-planar, each of said wafers having a thickness substantially in the order of 5 mils or less to thereby prevent the transfer of deflections from one edge to another edge.

3. In a stuffing-box containing a slideable piston rod, a plurality of non-planar metallic foil wafer seals having inner and outer edges and stacked in a juxtaposed assembly between the stuffing-box and piston rod so as to provide a permanent and tight joint therebetween, said wafer seals each having a thickness of 5 mils or less, thereby sealing at said inner and outer edges thereof without transfer of deflections between said edges.

References Cited in the file of this patent

UNITED STATES PATENTS

| | | |
|---|---|---|
| 200,458 | Jerome | Feb. 19, 1878 |
| 351,828 | Bushnell | Nov. 2, 1886 |
| 583,451 | Brady | June 1, 1897 |
| 637,098 | Endruweit | Nov. 14, 1899 |
| 660,523 | Walker | Oct. 23, 1900 |
| 1,989,903 | Wheeler | Feb. 5, 1935 |
| 2,075,947 | Kennedy | Apr. 6, 1937 |
| 2,537,230 | Mueller | Jan. 9, 1951 |

FOREIGN PATENTS

| | | |
|---|---|---|
| 408,870 | Great Britain | Apr. 19, 1934 |